United States Patent
Alkhawaja et al.

(10) Patent No.: US 12,273,442 B2
(45) Date of Patent: Apr. 8, 2025

(54) AUTOMATING THE CREATION AND MAINTENANCE OF CONTAINERIZED APPLICATIONS' CUSTOM ROUTES AND ASSOCIATED SSL CERTIFICATES

(71) Applicant: Saudi Arabian Oil Company, Dhahran (SA)

(72) Inventors: Aqeel Hussain Alkhawaja, Dammam (SA); Haidar A. AlDajani, Dammam (SA); Hamad Abdullatif Almaghlouth, Al Khobar (SA); Hossam Abdulwahid Aljunaidi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 258 days.

(21) Appl. No.: 17/890,149

(22) Filed: Aug. 17, 2022

(65) Prior Publication Data

US 2024/0064005 A1   Feb. 22, 2024

(51) Int. Cl.
| | |
|---|---|
| *H04L 9/08* | (2006.01) |
| *G06F 3/06* | (2006.01) |
| *G06F 9/455* | (2018.01) |
| *H04L 9/00* | (2022.01) |
| *H04L 9/32* | (2006.01) |
| *H04L 15/16* | (2006.01) |
| *H04L 61/4511* | (2022.01) |

(52) U.S. Cl.
CPC .......... *H04L 9/0825* (2013.01); *H04L 9/3213* (2013.01); *H04L 9/3247* (2013.01); *H04L 9/3268* (2013.01); *H04L 61/4511* (2022.05)

(58) Field of Classification Search
CPC ................. H04L 9/0825; H04L 9/3213; H04L 9/3247; H04L 9/3268; H04L 61/4511; H04L 2209/64
USPC ....................................................... 713/171
See application file for complete search history.

(56) References Cited

U.S. PATENT DOCUMENTS

| | | | |
|---|---|---|---|
| 10,599,402 B2 | 3/2020 | Landowski et al. | |
| 2011/0047374 A1* | 2/2011 | Liu .......................... | H04L 9/007 380/277 |
| 2012/0204032 A1* | 8/2012 | Wilkins ................... | H04L 9/321 713/170 |
| 2015/0088754 A1* | 3/2015 | Kirsch .................... | H04L 63/061 713/171 |
| 2015/0121078 A1* | 4/2015 | Fu .......................... | H04L 9/3263 713/175 |

(Continued)

*Primary Examiner* — David R Lazaro
*Assistant Examiner* — Berhanu Shitayewoldetadik
(74) *Attorney, Agent, or Firm* — Fish & Richardson P.C.

(57) ABSTRACT

Systems and methods include a system in which a creation request is received at a job-based pod to create a containerized application custom route and SSL certificates. A signed certificate for the creation request is received from a Public Key Infrastructure services system. A DNS request is sent to a DNS service with instructions to query an IP address associated with the DNS request. A DNS response is received from the DNS service. An application request is connected to an OpenShift Container (OCP) cluster to validate certificates for a route associated with the IP address and to feed a URL for the route to a master OCP cluster. A documentation request to document activities associated with the app request and the URL is provided to a ticketing system. A developer is informed of a completion of the creation request, and the URL is provided to the developer.

20 Claims, 5 Drawing Sheets

(56) References Cited

U.S. PATENT DOCUMENTS

| | | | |
|---|---|---|---|
| 2015/0271296 A1* | 9/2015 | Borzycki | G06F 21/53 |
| | | | 709/202 |
| 2020/0272768 A1* | 8/2020 | Zou | H04L 9/50 |
| 2021/0337033 A1* | 10/2021 | Madisetti | H04L 67/104 |
| 2022/0158926 A1* | 5/2022 | Wennerstrom et al. | |
| | | | H04L 41/0853 |
| 2023/0008901 A1* | 1/2023 | McDowall | H04L 63/1408 |
| 2023/0082851 A1* | 3/2023 | Liu | H04L 9/0825 |
| | | | 726/22 |
| 2024/0146511 A1* | 5/2024 | S | H04L 9/3263 |
| 2024/0211157 A1* | 6/2024 | Prasannakumar | G06F 3/0647 |
| 2024/0212478 A1* | 6/2024 | Brown | H04W 4/38 |

\* cited by examiner (PRIOR ART)
FIG. 1

FIG. 5

AUTOMATING THE CREATION AND MAINTENANCE OF CONTAINERIZED APPLICATIONS' CUSTOM ROUTES AND ASSOCIATED SSL CERTIFICATES

TECHNICAL FIELD

The present disclosure applies to assigning Uniform Resource Locators (URLs) and Secure Sockets Layer (SSL) certificates.

BACKGROUND

Figure 1:
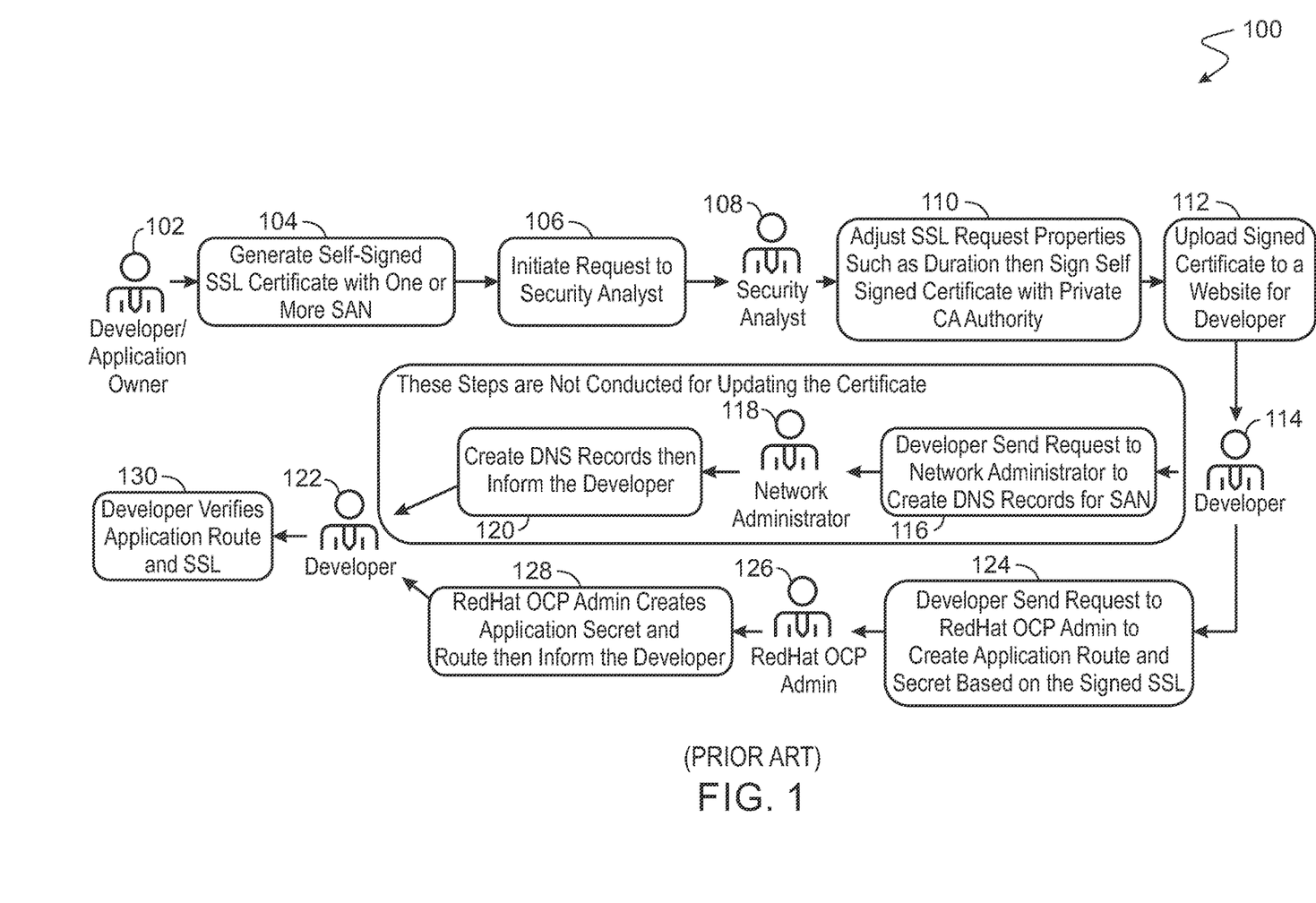
FIG. 1 is a flow diagram showing an example of a workflow used in conventional systems for assigning custom routes and associated Secure Sockets Layer (SSL) certificates, according to some implementations of the present disclosure.

In conventional systems, deployed applications on RedHat OpenShift, for example, get a default route from the platform predefined subdomain, e.g., https://application1.apps.ocpdomain.maindomain1.com. Some application owners/developers may want to have a custom route with a private or public domain other than the domain RedHat OpenShift, e.g., that is hosted on https://application1.privatedomain.com. Due to RedHat OpenShift limitations, for example, the application owners/developers may need to: create a Domain Name System (DNS); generate an SSL certificate and sign it by the private CA Authority; store the certificate with a private CA authority public key on OpenShift; create routes for their applications and services within the project namespace, and create a secret key that has an SSL certificate signed by a private CA Authority using a CA Authority public key. For such a request, the application owner/developer must submit multiple requests to different entities with an information technology (IT) department. Such a process in conventional systems is shown in FIG. 1. Also, maintaining and renewing the SSL certificate may require the same general steps except for DNS creation. The process is lengthy and has a high potential for human error. Additionally, the process posed a potentially high risk to business continuity, as the application certificate may expire before the renewal process is completed. The process can take a minimum of three days and involve four different employees.

SUMMARY

The present disclosure describes techniques that can be used for automating the creation and maintenance of containerized applications' custom routes and associated Secure Sockets Layer (SSL) certificates, e.g., on a RedHat OpenShift platform. In some implementations, a computer-implemented method includes the following. A creation request is received at a job-based pod used in a container orchestration system to create a containerized application custom route and Secure Sockets Layer (SSL) certificates associated with the containerized application custom route. The creation request for auto-signing of the creation request is sent by the job-based pod to a Public Key Infrastructure (PKI) services system. A signed certificate for the creation request is received from the PKI services system in response to sending the creation request. A DNS request is sent to a Domain Name System (DNS) service with instructions to query an Internet protocol (IP) address associated with the DNS request and provide a list of aliases associated with the IP address. A DNS response to the DNS request is received from the DNS service. An application (app) request is connected to an OpenShift Container (OCP) cluster to validate certificates for a route associated with the IP address and to feed a universal resource locator (URL) for the route to a master OCP cluster. A response to the app request is received from the OCP cluster. A documentation request to document activities associated with the app request and the URL is provided to a ticketing system. A developer associated with the creation request is informed of a completion of the creation request, and the URL is provided to the developer.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Man-hours for creating and maintaining containerized applications' custom routes and associated SSL certificates can be reduced from 3 days per request to a maximum 30 minutes, depending on network latency and hardware speed. Manpower can be reduced from 4 entities (e.g., developer, OpenShift Container Platform (OCP) administrator, network administrator, and security analyst) to zero entities (e.g., fully-automated). Human errors can be eliminated. Business continuity can be sustained through proactive measures.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for automating the creation and maintenance of containerized applications' custom routes and associated Secure Sockets Layer (SSL) certificates, e.g., on a RedHat OpenShift Platform. The techniques can be used to provide a solution that reduces the four-day turn-around times described in the Background section to a maximum of 30 minutes, and manpower to null. In addition, using the techniques can eliminate most or all human errors. The techniques can include building a containerized-based automated execution framework using any programming tool/language such as Java, JavaScript, and Bash scripting to orchestrate the process of creating an SSL certificate with custom domains for containerized applications, e.g., running on a RedHat OpenShift platform.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

FIG. 1 is a flow diagram showing an example of a workflow 100 used in conventional systems for assigning custom routes and associated SSL certificates, according to some implementations of the present disclosure. At 104, a developer/application owner 102 generates a self-signed SSL certificate with one or more SANs. At 106, a request is initiated to a security analyst 108. At 110, SSL request properties, such as duration, are adjusted, then a self-signed certificate is signed by a private CA authority. At 112, a signed certificate is uploaded to a website for a developer 114. At 116, the developer sends a request to a network administrator 118 to create DNS records for the SAN. At 120, DNS records are created, and the developer 122 is informed. At 124, the developer 122 sends a request to a RedHat OCP administrator 126 to create an application route and secret key based on the signed SSL. At 128, the RedHat OCP administrator 126 creates the application secret key and route, and informs the developer. At 130, the developer verifies the application route and SSL. Developer/application owner 102 can be the same as developers 114 and 122, or they can be different people.

Process of Creating

Prerequisites—Creating

Figure 2:
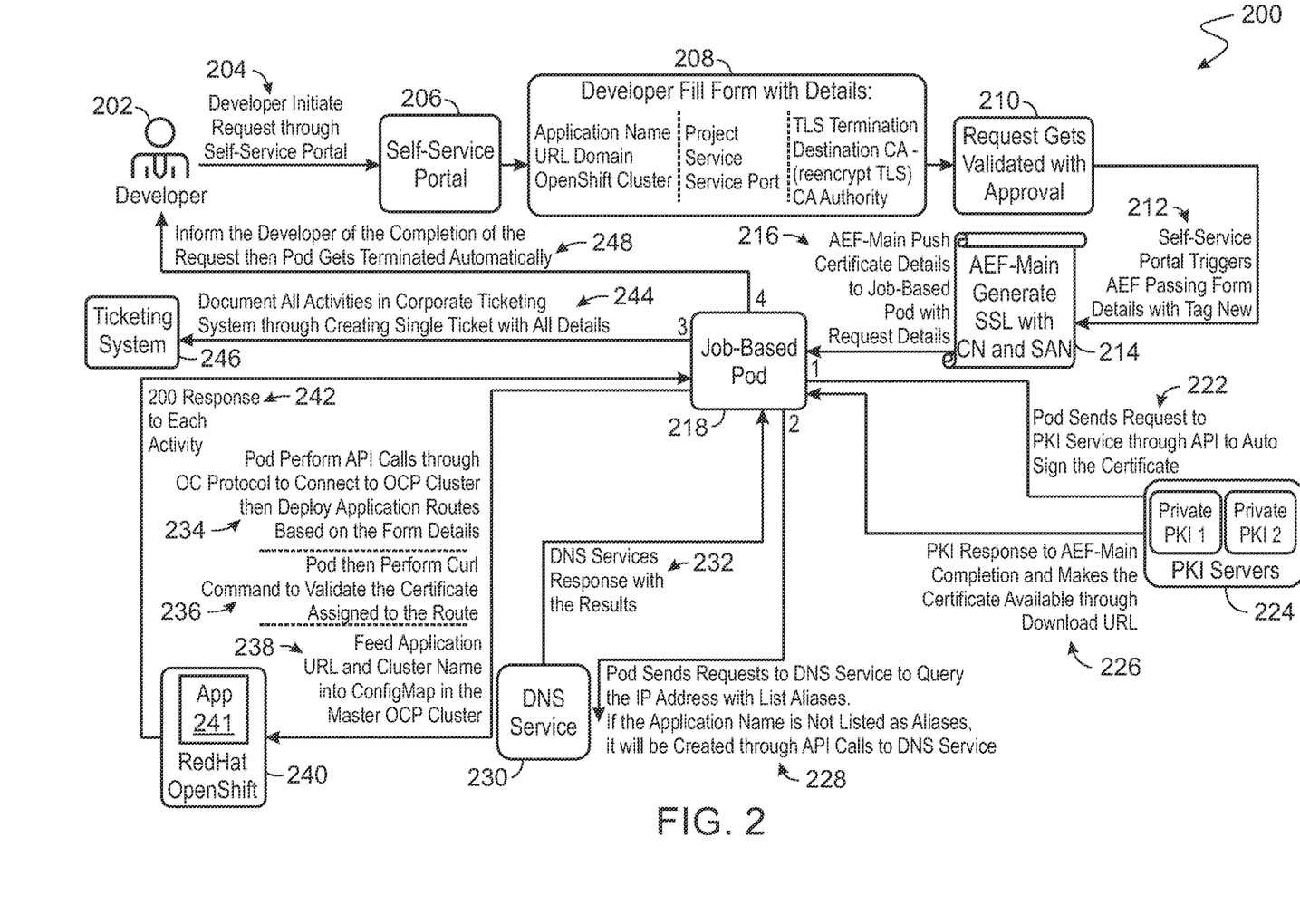
FIG. 2 is a flow diagram showing an example of a workflow for creating containerized applications' custom routes and associated SSL certificates, according to some implementations of the present disclosure.

The following are prerequisites that can be mandatory prior to the start of the workflow 200 of FIG. 2. The application is already deployed on OCP. A requirement exists for a custom Uniform Resource Locator (URL) (e.g., https://app1.domain.com), signed by a private/public key infrastructure (PKI) service. Edge or re-encrypt options are only for transparent local area network (LAN) Service (TLS) TLS termination (e.g., passthrough does not apply). All systems support application programmer interface (API) protocols. AEF-main has an OpenShift container platform (OCP) token for an OpenShift service account that has a cluster administrator. CA authority is already integrated with AEF-main. AEF-main is already hosted in a master OCP cluster alongside AEF-renewal2 for the renewal process. The workflow 200 can provide orchestration between different systems and can be modified or enhanced to work with other systems and requirements.

Form Input—Creating

FIG. 2 is a flow diagram showing an example of a workflow 200 for creating containerized applications' custom routes and associated Secure Sockets Layer (SSL) certificates, according to some implementations of the present disclosure. After all prerequisites are met, the application owner/developer (e.g., developer 202) can initiate a request 204 by completing an online form through a self-service portal 206 solution. The form can include at least fields/entities 208: application name, URL domain, OpenShift cluster, project, service, service port, TLS termination type, destination CA (e.g., to re-encrypt TLS), and CA authority.

Procedure—Creating

After the form is submitted, the self-service portal can forward the request 210 through POST API protocol with an authorized user to the AEF-main where the request will be handled. For example, the self-service portal can trigger (212) AEF, passing the form details with a tag of "new."

At 214, the AEF-main can generate a self-signed SSL Certificate with common Name and SAN as the application name with the domain. AEF-main deploys (216) a job-based pod 218 with certificate and request details to perform the following steps sequentially, in which all responses to the corresponding API call must indicate success (e.g., success code "200") in order for the creative process to continue.

First, in a first request for signing the certificate with a private PKI to a private PKI server 224: 1) a private PKI server 224 receives (222) the request to sign the certificate; 2) the private PKI server 224 adjusts the certificate template to comply with PKI standards; 3) the private PKI server 224 signs the certificate; 4) the private PKI server 224 makes the certificate available through a download link customized for the job-based pod 218 through a generic user, and 5) the private PKI server 224 returns a success code response (226) with a download URL.

Next, in a second request 228 for a DNS service 230 to create an alias for the application on the OpenShift cluster public internet protocol (IP) load balancer: 1) the DNS service queries an OpenShift cluster public IP load balancer, and 2) the DNS service validates whether the DNS service 230 will return a success response 232 alias is created or not. If the alias has already been created, as the action is already implemented. If the alias has not already been created, the alias will be created, and a success response will be returned.

Next, the job-based pod 218 performs API calls 234 through an OpenShift Cluster (OC) 240 protocol to connect to a targeted OpenShift Cluster 240 (using an app 241). The job-based pod 218 performs multiple API calls through the OC protocol: 1) an application route is created with a secure route option in the targeted project with the signed SSL certificate, SSL private key, CA Authority public key, service name, and service port; 2) at 236, if the TLS termination type is "re-encrypt," then the destination CA is passed to the route as well. The URL is added (238) to the master machineConfig for monitoring certificate expiry, and for triggering a renewal process. Each API call is to return a success response 242 for the process to continue.

At 244, the job-based pod 218 issues a client URL (curl) command to curl the URL to validate the availability with the correct certificate and to enable data transfer over various network protocols. At 246, the job-based pod 218 makes an API call to a ticketing system 246 to document (or record) all activities. At 248, the job-based pod 218 informs the requester of the successful completion, e.g., through an email.

Process of Renewal

Renewing an already existing SSL certificate

Prerequisites—Renewal

Figure 3:
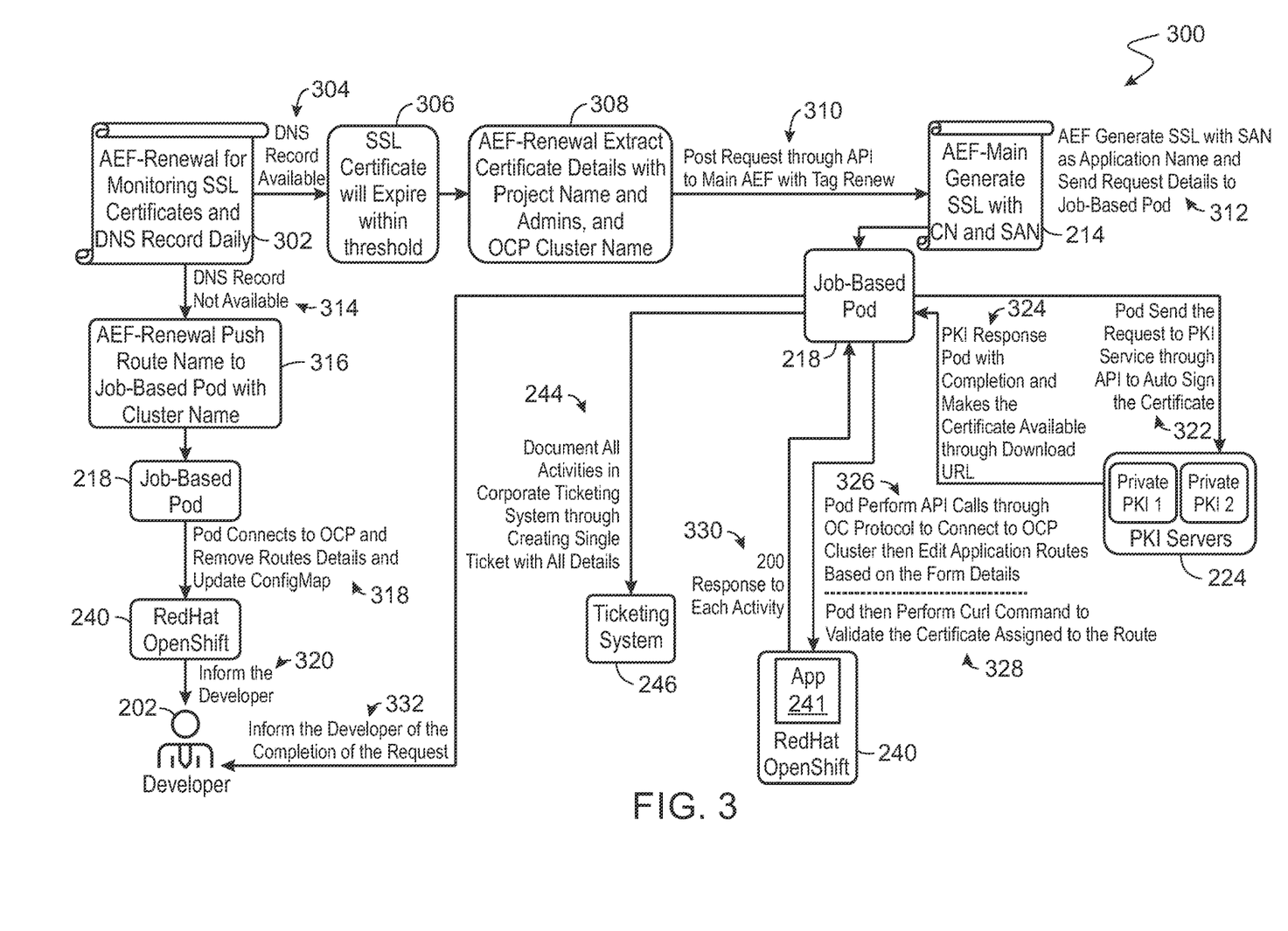
FIG. 3 is a flow diagram showing an example of a workflow for renewing containerized applications' custom routes and associated SSL certificates, according to some implementations of the present disclosure.

FIG. 3 is a flow diagram showing an example of a workflow 300 for renewing containerized applications' custom routes and associated SSL certificates, according to some implementations of the present disclosure. The following are prerequisites that can be mandatory prior to the start of the workflow 300. All systems support API protocols. AEF-main has an OCP token for an OpenShift service account that has a cluster administrator. AEF-renewal has an OCP token for an OpenShift service account that has a cluster administrator. A CA authority is already integrated with AEF-main. The application is already deployed on OCP. AEF-main is already hosted in a master OCP cluster alongside AEF-renewal2 for the renewal process.

Procedure—Renewal

AEF-renewal will be used to monitor SSL Certificate and DNS records availability, which will be scheduled through the RedHat OpenShift Platform. The list of records will be provided through configmap to AEF-renewal to monitor (302) once a day, through curl and openssl commands, then based on the output, the following actions will be taken At 304, if the DNS records are available, but the certificate will expire within threshold period 306. The renewal process will start. AEF-renewal will extract (308) the required CN and SAN, and CA Authority from the existing certificate, Openshift cluster name, project name, and project users. Then an API POST call 310 to AEF-main 214 is performed with a tag of "renew" and the extracted details. AEF-main will deploy the job-based pod 218 with certificate and request details to perform the following sequentially—all responses to API calls must have a successful response. AEF-main deploys (214) a job-based pod 218 with certificate and request details 312 to perform the following steps sequentially, in which all responses to the corresponding API call must indicate success (e.g., success code "200") in order for the create process to continue.

At 314, if the DNS records are not available, meaning the records have been removed, the AEF-renewal will deploy the job-based pod 218 and pass (316) route and cluster name to remove (318) the route and its associated configurations from Openshift 240 through OC API calls. Then the developer/owner of the application is informed (320) and the process ends here.

First, a request 322 for signing the certificate with a private PKI is sent to a private PKI server 224: 1) the private PKI server 224 receives the request to sign the certificate; 2) the private PKI server 224 adjusts the certificate template to comply with PKI standards; 3) the private PKI server 224 signs the certificate; 4) the Private PKI server 224 makes the certificate available through a download link customized for the job-based pod 218 through a generic user; and 5) the private PKI server 224 returns a success response 324 with a download URL.

The job-based pod 218 performs API calls through OC protocol to connect to the targeted OpenShift Cluster. Next, the job-based pod 218 performs multiple API calls 326 through OC protocol. An application route is updated in the targeted project with the signed SSL certificate, SSL private key, and CA authority public key. If the TLS termination type is re-encrypt, the destination CA is passed to the route as well. The URL is updated in the Master machineConfig for monitoring certificate expiry, and triggering a renewal process when needed.

Next, the job-based pod 218 curls (328) the URL to validate the availability with the correct certificate. The job-based pod 218 makes an API call to the ticketing system 246 to document (or record) all activities. Each API call is to return a success response 330 for the process to continue. At 332, the requester is informed of the successful completion (e.g., through email).

Figure 4:
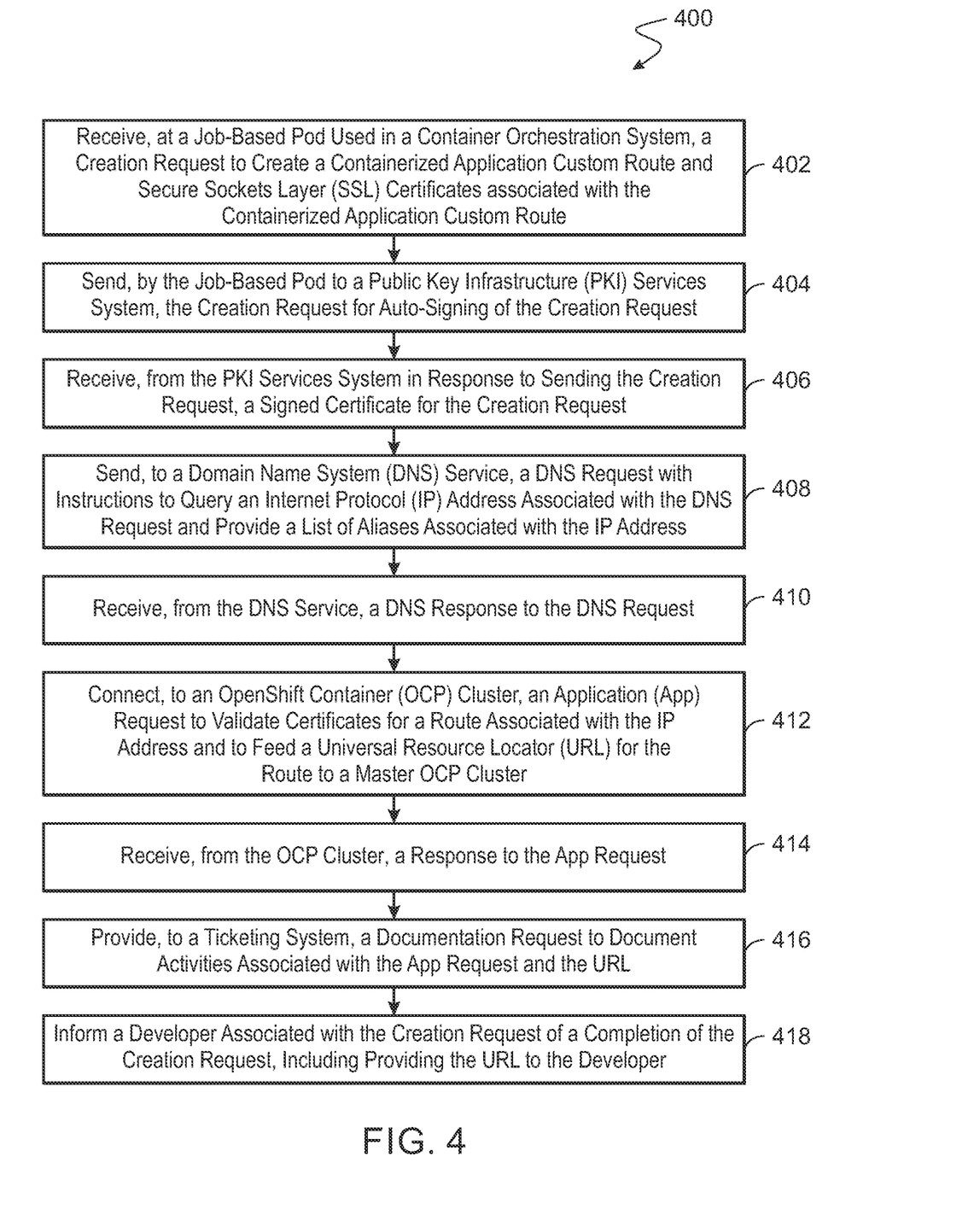
FIG. 4 is a flowchart of an example of a method for automating the creation of containerized applications' custom routes and associated SSL certificates, according to some implementations of the present disclosure.

FIG. 4 is a flowchart of an example of a method 400 for automating the creation of containerized applications' custom routes and associated SSL certificates, according to some implementations of the present disclosure. For clarity of presentation, the description that follows generally describes method 400 in the context of the other figures in this description, particularly FIG. 2. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order. Similar and/or additional steps can be used for renewing the containerized applications' custom routes and associated SSL certificates, as described with reference to FIG. 3.

At 402, a creation request is received at a job-based pod used in a container orchestration system. The creation request is a request to create a containerized application custom route and Secure Sockets Layer (SSL) certificates associated with the containerized application custom route. For example, the application owner/developer (e.g., developer 202) can initiate a request 204 by completing an online form through a self-service portal 206 solution. From 402, method 400 proceeds to 404.

At 404, the creation request for auto-signing of the creation request is sent by the job-based pod to a Public Key Infrastructure (PKI) services system. As an example, a request for signing the certificate with a private PKI can be sent to the private PKI server 224. From 404, method 400 proceeds to 406.

At 406, a signed certificate for the creation request is received from the PKI services system in response to sending the creation request. For example, the private PKI server 224 can make the certificate available to a generic user through a download link customized for the job-based pod 218. From 406, method 400 proceeds to 408.

At 408, a DNS request is sent to a Domain Name System (DNS) service with instructions to query an Internet protocol (IP) address associated with the DNS request and to provide a list of aliases associated with the IP address. As an example, the request 228 for a DNS service 230 can be sent to create an alias for the application on the OpenShift cluster public internet protocol (IP) load balancer. From 408, method 400 proceeds to 410.

At 410, a DNS response to the DNS request is received from the DNS service. For example, the DNS service 230 will return a success response 232. From 410, method 400 proceeds to 412.

At 412, an application (app) request is connected to an OpenShift Container (OCP) cluster to validate certificates for a route associated with the IP address and to feed a universal resource locator (URL) for the route to a master OCP cluster. For example, the job-based pod 218 can perform API calls 234 through the OC 240 protocol to connect to the targeted OpenShift Cluster 240. From 412, method 400 proceeds to 414.

At 414, a response to the app request is received from the OCP cluster. As an example, each API call is to return a success response 242 for the process to continue. From 414, method 400 proceeds to 416.

At 416, a documentation request to document activities associated with the app request and the URL is provided to a ticketing system. For example, the job-based pod 218 can make an API call to the ticketing system 246 to document (or record) all activities. From 416, method 400 proceeds to 418.

At 418, a developer associated with the creation request is informed of a completion of the creation request, and the URL is provided to the developer. For example, the job-based pod 218 can inform the requester of the successful completion, e.g., through an email. After 418, method 400 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions. In addition, the suggestions can be implemented to enforce security measures on corporate application solutions, and extended to multiple end-user focused features to shorten the processing time, and ensure business continuity.

Figure 5:
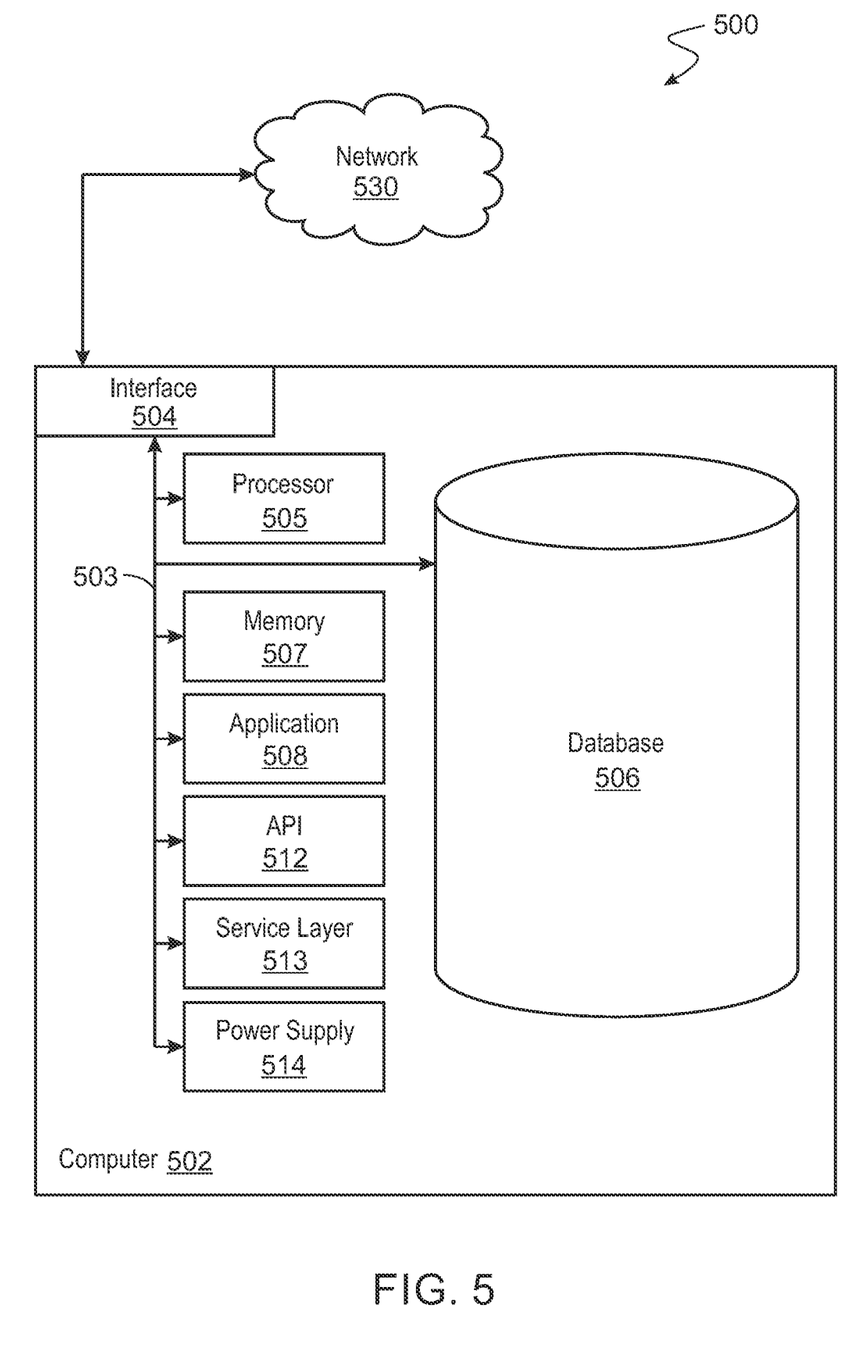
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A creation request is received at a job-based pod used in a container orchestration system to create a containerized application custom route and Secure Sockets Layer (SSL) certificates associated with the containerized application custom route. The creation request for auto-signing of the creation request is sent by the job-based pod to a Public Key Infrastructure (PKI) services system. A signed certificate for the creation request is received from the PKI services system in response to sending the creation request. A DNS request is sent to a Domain Name System (DNS) service with instructions to query an Internet protocol (IP) address associated with the DNS request and provide a list of aliases associated with the IP address. A DNS response to the DNS request is received from the DNS service. An application (app) request is connected to an OpenShift Container (OCP) cluster to validate certificates for a route associated with the IP address and to feed a universal resource locator (URL) for the route to a master OCP cluster. A response to the app request is received from the OCP cluster. A documentation request to document activities associated with the app request and the URL is provided to a ticketing system. A developer associated with the creation request is informed of a completion of the creation request, and the URL is provided to the developer.

The foregoing and other described implementations can each, optionally, include one or more of the following features:

A first feature, combinable with any of the following features, where the container orchestration system is an open-source container orchestration system.

A second feature, combinable with any of the previous or following features, where the method further includes determining that the SSL certificate will expire within a threshold period.

A third feature, combinable with any of the previous or following features, where the method further includes performing a renewal process on the SSL certificate.

A fourth feature, combinable with any of the previous or following features, where performing the renewal process on the SSL certificate includes extracting certificate details from the SSL certificate including an Openshift cluster name, a project name, and project users.

A fifth feature, combinable with any of the previous or following features, where performing the renewal process on the SSL certificate includes sending a request to the PKI services system and receiving a response upon completion.

A sixth feature, combinable with any of the previous or following features, where performing the renewal process on the SSL certificate includes performing API calls to edit an application route and validating the SSL certificate assigned to the application route.

In a second implementation, a non-transitory, computer-readable medium stores one or more instructions executable by a computer system to perform operations including the following. A creation request is received at a job-based pod used in a container orchestration system to create a containerized application custom route and Secure Sockets Layer (SSL) certificates associated with the containerized application custom route. The creation request for auto-signing of the creation request is sent by the job-based pod to a Public Key Infrastructure (PKI) services system. A signed certificate for the creation request is received from the PKI services system in response to sending the creation request. A DNS request is sent to a Domain Name System (DNS) service with instructions to query an Internet protocol (IP) address associated with the DNS request and provide a list of aliases associated with the IP address. A DNS response to the DNS request is received from the DNS service. An application (app) request is connected to an OpenShift Container (OCP) cluster to validate certificates for a route associated with the IP address and to feed a universal resource locator (URL) for the route to a master OCP cluster. A response to the app request is received from the OCP cluster. A documentation request to document activities associated with the app request and the URL is provided to a ticketing system. A developer associated with the creation request is informed of a completion of the creation request, and the URL is provided to the developer.

The foregoing and other described implementations can each, optionally, include one or more of the following features:

A first feature, combinable with any of the following features, where the container orchestration system is an open-source container orchestration system.

A second feature, combinable with any of the previous or following features, where the method further includes determining that the SSL certificate will expire within a threshold period.

A third feature, combinable with any of the previous or following features, where the method further includes performing a renewal process on the SSL certificate.

A fourth feature, combinable with any of the previous or following features, where performing the renewal process on the SSL certificate includes extracting certificate details from the SSL certificate including an Openshift cluster name, a project name, and project users.

A fifth feature, combinable with any of the previous or following features, where performing the renewal process on the SSL certificate includes sending a request to the PKI services system and receiving a response upon completion.

A sixth feature, combinable with any of the previous or following features, where performing the renewal process on the SSL certificate includes performing API calls to edit an application route and validating the SSL certificate assigned to the application route.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A creation request is received at a job-based pod used in a container orchestration system to create a containerized application custom route and Secure Sockets Layer (SSL) certificates associated with the containerized application custom route. The creation request for auto-signing of the creation request is sent by the job-based pod to a Public Key Infrastructure (PKI) services system. A signed certificate for the creation request is received from the PKI services system in response to sending the creation request. A DNS request is sent to a Domain Name System (DNS) service with instructions to query an Internet protocol (IP) address associated with the DNS request and provide a list of aliases associated with the IP address. A DNS response to the DNS request is received from the DNS service. An application (app) request is connected to an OpenShift Container (OCP) cluster to validate certificates for a route associated with the IP address and to feed a universal resource locator (URL) for the route to a master OCP cluster. A response to the app request is received from the OCP cluster. A documentation request to document activities associated with the app request and the URL is provided to a ticketing system. A developer associated with the creation request is informed of a completion of the creation request, and the URL is provided to the developer.

The foregoing and other described implementations can each, optionally, include one or more of the following features:

A first feature, combinable with any of the following features, where the container orchestration system is an open-source container orchestration system.

A second feature, combinable with any of the previous or following features, where the method further includes determining that the SSL certificate will expire within a threshold period.

A third feature, combinable with any of the previous or following features, where the method further includes performing a renewal process on the SSL certificate.

A fourth feature, combinable with any of the previous or following features, where performing the renewal process on the SSL certificate includes extracting certificate details from the SSL certificate including an Openshift cluster name, a project name, and project users.

A fifth feature, combinable with any of the previous or following features, where performing the renewal process on the SSL certificate includes sending a request to the PKI services system and receiving a response upon completion.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:
1. A computer-implemented method, comprising:
receiving, at a job-based pod used in a container orchestration system, a creation request to create a containerized application custom route and Secure Sockets

Layer (SSL) certificates associated with the containerized application custom route;

sending, by the job-based pod to a Public Key Infrastructure (PKI) services system, the creation request for auto-signing of the creation request, wherein the PKI services system adjusts a certificate template to comply with PKI standards to generate a signed certificate, the private PKI server makes the signed certificate available through a download link customized for the job-based pod;

receiving, from the PKI services system in response to sending the creation request, the signed certificate for the creation request;

sending, to a Domain Name System (DNS) service, a DNS request with instructions to query an Internet protocol (IP) address associated with the DNS request and provide a list of aliases associated with the IP address;

receiving, from the DNS service, a DNS response to the DNS request;

connecting, to an OpenShift Container (OCP) cluster, an application (app) request to validate certificates for a route associated with the IP address and to feed a universal resource locator (URL) for the route to a master OCP cluster;

receiving, from the OCP cluster, a response to the app request;

providing, to a ticketing system, a documentation request to document activities associated with the app request and the URL; and informing a developer associated with the creation request of a completion of the creation request, comprising providing the URL to the developer.

2. The computer-implemented method of claim 1, wherein the container orchestration system is an open-source container orchestration system.

3. The computer-implemented method of claim 1, further comprising determining that the SSL certificate is set to expire within a threshold period.

4. The computer-implemented method of claim 1, further comprising performing a renewal process on the SSL certificate.

5. The computer-implemented method of claim 4, wherein performing the renewal process on the SSL certificate comprises extracting certificate details from the SSL certificate comprising an Openshift cluster name, a project name, and project users.

6. The computer-implemented method of claim 4, wherein performing the renewal process on the SSL certificate comprises sending a request to the PKI services system and receiving a response upon completion.

7. The computer-implemented method of claim 4, wherein performing the renewal process on the SSL certificate comprises performing API calls to edit an application route and validating the SSL certificate assigned to the application route.

8. A non-transitory, computer-readable medium storing one or more instructions executable by a computer system to perform operations comprising:

receiving, at a job-based pod used in a container orchestration system, a creation request to create a containerized application custom route and Secure Sockets Layer (SSL) certificates associated with the containerized application custom route;

sending, by the job-based pod to a Public Key Infrastructure (PKI) services system, the creation request for auto-signing of the creation request, wherein the PKI services system adjusts a certificate template to comply with PKI standards to generate a signed certificate, the private PKI server makes the signed certificate available through a download link customized for the job-based pod;

receiving, from the PKI services system in response to sending the creation request, the signed certificate for the creation request;

sending, to a Domain Name System (DNS) service, a DNS request with instructions to query an Internet protocol (IP) address associated with the DNS request and provide a list of aliases associated with the IP address;

receiving, from the DNS service, a DNS response to the DNS request;

connecting, to an OpenShift Container (OCP) cluster, an application (app) request to validate certificates for a route associated with the IP address and to feed a universal resource locator (URL) for the route to a master OCP cluster;

receiving, from the OCP cluster, a response to the app request;

providing, to a ticketing system, a documentation request to document activities associated with the app request and the URL; and informing a developer associated with the creation request of a completion of the creation request, comprising providing the URL to the developer.

9. The non-transitory, computer-readable medium of claim 8, wherein the container orchestration system is an open-source container orchestration system.

10. The non-transitory, computer-readable medium of claim 8, further comprising determining that the SSL certificate is set to expire within a threshold period.

11. The non-transitory, computer-readable medium of claim 8, further comprising performing a renewal process on the SSL certificate.

12. The non-transitory, computer-readable medium of claim 11, wherein performing the renewal process on the SSL certificate comprises extracting certificate details from the SSL certificate comprising an Openshift cluster name, a project name, and project users.

13. The non-transitory, computer-readable medium of claim 11, wherein performing the renewal process on the SSL certificate comprises sending a request to the PKI services system and receiving a response upon completion.

14. The non-transitory, computer-readable medium of claim 11, wherein performing the renewal process on the SSL certificate comprises performing API calls to edit an application route and validating the SSL certificate assigned to the application route.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

receiving, at a job-based pod used in a container orchestration system, a creation request to create a containerized application custom route and Secure Sockets Layer (SSL) certificates associated with the containerized application custom route;

sending, by the job-based pod to a Public Key Infrastructure (PKI) services system, the creation request for auto-signing of the creation request, wherein the PKI services system adjusts a certificate template to comply with PKI standards to generate a signed certificate, the private PKI server makes the signed certificate available through a download link customized for the job-based pod;

receiving, from the PKI services system in response to sending the creation request, the signed certificate for the creation request;

sending, to a Domain Name System (DNS) service, a DNS request with instructions to query an Internet protocol (IP) address associated with the DNS request and provide a list of aliases associated with the IP address;

receiving, from the DNS service, a DNS response to the DNS request;

connecting, to an OpenShift Container (OCP) cluster, an application (app) request to validate certificates for a route associated with the IP address and to feed a universal resource locator (URL) for the route to a master OCP cluster;

receiving, from the OCP cluster, a response to the app request;

providing, to a ticketing system, a documentation request to document activities associated with the app request and the URL; and informing a developer associated with the creation request of a completion of the creation request, comprising providing the URL to the developer.

16. The computer-implemented system of claim 15, wherein the container orchestration system is an open-source container orchestration system.

17. The computer-implemented system of claim 15, further comprising determining that the SSL certificate is set to expire within a threshold period.

18. The computer-implemented system of claim 15, further comprising performing a renewal process on the SSL certificate.

19. The computer-implemented system of claim 18, wherein performing the renewal process on the SSL certificate comprises extracting certificate details from the SSL certificate comprising an Openshift cluster name, a project name, and project users.

20. The computer-implemented system of claim 18, wherein performing the renewal process on the SSL certificate comprises sending a request to the PKI services system and receiving a response upon completion.

* * * * *